United States Patent [19]
Omori et al.

[11] Patent Number: 5,319,174
[45] Date of Patent: Jun. 7, 1994

[54] INDUCTION HEATING COOKER WITH CONSTANT FREQUENCY CONTROLLED INVERTER

[75] Inventors: Hideki Omori, Akashi; Hirofumi Noma, Toyonaka; Hideyuki Kominami, Kobe; Toshiaki Iwai, Nishinomiya; Kazuhiko Asada, Kyoto, all of Japan

[73] Assignee: Matsushita Electric Industrial Co., Ltd., Kadoma, Japan

[21] Appl. No.: 573,407

[22] Filed: Aug. 28, 1990

[30] Foreign Application Priority Data

Jun. 7, 1990 [JP] Japan ................. 2-149409

[51] Int. Cl.$^5$ ............................................. H05B 6/12
[52] U.S. Cl. .................................... 219/664; 219/625; 363/97
[58] Field of Search ............... 219/10.77, 10.493; 363/96, 97, 131, 132, 98

[56] References Cited

U.S. PATENT DOCUMENTS

| | | | |
|---|---|---|---|
| 3,781,503 | 12/1973 | Harnden, Jr. et al. | 219/10.493 |
| 4,241,250 | 12/1980 | Steigerwald | 219/10.77 |
| 4,376,969 | 3/1983 | Bedard et al. | 363/78 |
| 4,426,564 | 1/1984 | Steigerwald et al. | |
| 4,429,205 | 1/1984 | Cox | 219/10.77 |
| 4,467,165 | 8/1984 | Kiuchi et al. | 219/10.77 |
| 4,559,590 | 12/1985 | Davidson | 363/21 |
| 4,564,733 | 1/1986 | Karklys | 219/10.77 |
| 4,599,504 | 7/1986 | Ito | 219/10.77 |
| 4,736,082 | 4/1988 | Matsuo et al. | |

FOREIGN PATENT DOCUMENTS

| | | |
|---|---|---|
| 0092588 | 11/1983 | European Pat. Off. |
| 2108786 | 5/1983 | United Kingdom |
| 2135538 | 8/1984 | United Kingdom |

OTHER PUBLICATIONS

L. Hobson et al., "Dual-Element Induction Cooking Unit Using Power MOSFETs", International Journal of Electronics vol. 59, No. 6, Dec. 1985, pp. 748-757.

*Primary Examiner*—Philip H. Leung
*Attorney, Agent, or Firm*—Cushman, Darby & Cushman

[57] ABSTRACT

An induction heating cooker has a rectifier (13) for producing pulsating DC current, an inverter (14) which receives the pulsating current given from the rectifier (13) and produces a high frequency output current and a load circuit (15) including an output coil (21) and a resonance capacitor (22) connected in series to each other to receive high frequency output signal from the inverter, and the variation or adjustment of output electromagnetic power is made by changing duty ratio of the high frequency output current of the inverter by giving variable duty ratio setting signals to switching elements (Qa, Qb) in the inverter 14; the frequency of the high frequency output current of the inverter 14 is fixed, and therefore, unpleasant interference sound is not generated at parallel simultaneous operation.

3 Claims, 10 Drawing Sheets

5,319,174

INDUCTION HEATING COOKER WITH CONSTANT FREQUENCY CONTROLLED INVERTER

FIELD OF THE INVENTION AND RELATED ART STATEMENT

1. Field of the Invention

The present invention relates to an induction heating cooker which is to be used in homes and restaurants.

2. Description of the Related Art

Induction heating cookers are widely used in homes and restaurants, due to their high safety and cleanliness. In some high-rise building or apartment, the induction heating cooker are forcedly widely used in place of gas cookers for its high safety.

The conventional induction heating cooker comprises a rectifier for producing DC current, an inverter for oscillating a high frequency current of for instance 20 KHz to 50 KHz by utilizing the DC output current of the rectifier, a load circuit which is fed with the high frequency output current from the inverter and for radiating a high frequency electromagnetic wave from its output coil, and a variable frequency circuit which controls and varies the high frequency current generated by the inverter in a range from the above-mentioned frequency range of 20 KHz to 50 KHz.

In such a conventional induction heating cooker, power of cooking is controlled by the changing of the high frequency generated in the inverter by changing the frequency issued from the variable frequency circuit 8. By the change of the frequency of the high frequency current from the inverter, the electromagnetic wave radiated from the coil in the load circuit widely changes and varies cooking power thereby.

When a plural number of such conventional induction heating cookers are used in nearby place operated, at the same time there is a problem of unpleasant interference noise. That is, pans heated by respective induction heating cookers produce vibrations at their frequencies of the electromagnetic wave of respective induction heating cooker. And therefore, frequency difference between vibrations of neighboring plural pans makes a range of audible frequency, namely, noise which is known as interference sound is produced. Such interference sound is inevitable since the parallel operation of the conventional induction heating cooker is carried out changing their cooking power by wide variation of the high frequency of the inverter output current fed to the radiation coil.

OBJECT AND SUMMARY OF THE INVENTION

The present invention purports to solve the above-mentioned problem, and to eliminate the interference sound even when two or more induction heating cooker are operated at the same time in nearby positions.

Furthermore, the induction heating cooker in accordance with the present invention can protect overload damages to switching elements in the inverter. Furthermore, the induction heating cooker in accordance with the present invention is free from interference sound even after long years of service or at temperature change or at other environmental influence.

The induction heating cooker in accordance with the present invention comprises:

a rectifier for producing a DC current by rectifying an AC current from an AC power source, an inverter having a pair of switching elements, which are each other series-connected across output terminals of said rectifier, a variable duty ratio oscillator for alternatingly drive the pair of switching elements in a manner that duty periods of the respective switching elements being controlled by duty-period and off-period of oscillation of the variable duty ratio oscillator, and a duty ratio setter for setting duty ratio of the oscillation, and a load circuit having an output coil and a resonation capacitor.

According to the induction heating cooker of the Present invention, the heating power can be varied freely By changing duty ratios of the switching elements keeping the frequency of the high frequency oscillator substantially constant.

In a detailed species of the invention, drivings of the switching elements are so controlled that the duty ratio is selected in such a range of under ½ or above ½, so that a feed back control of the duty ratio to make output heating power at desired value is stable.

In a further detailed species in accordance with the present invention, a pair of inverters and a pair of load circuits are provided and respective variable duty ratio oscillators are mutually coupled for realizing synchronous oscillation of the two variable duty oscillators.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
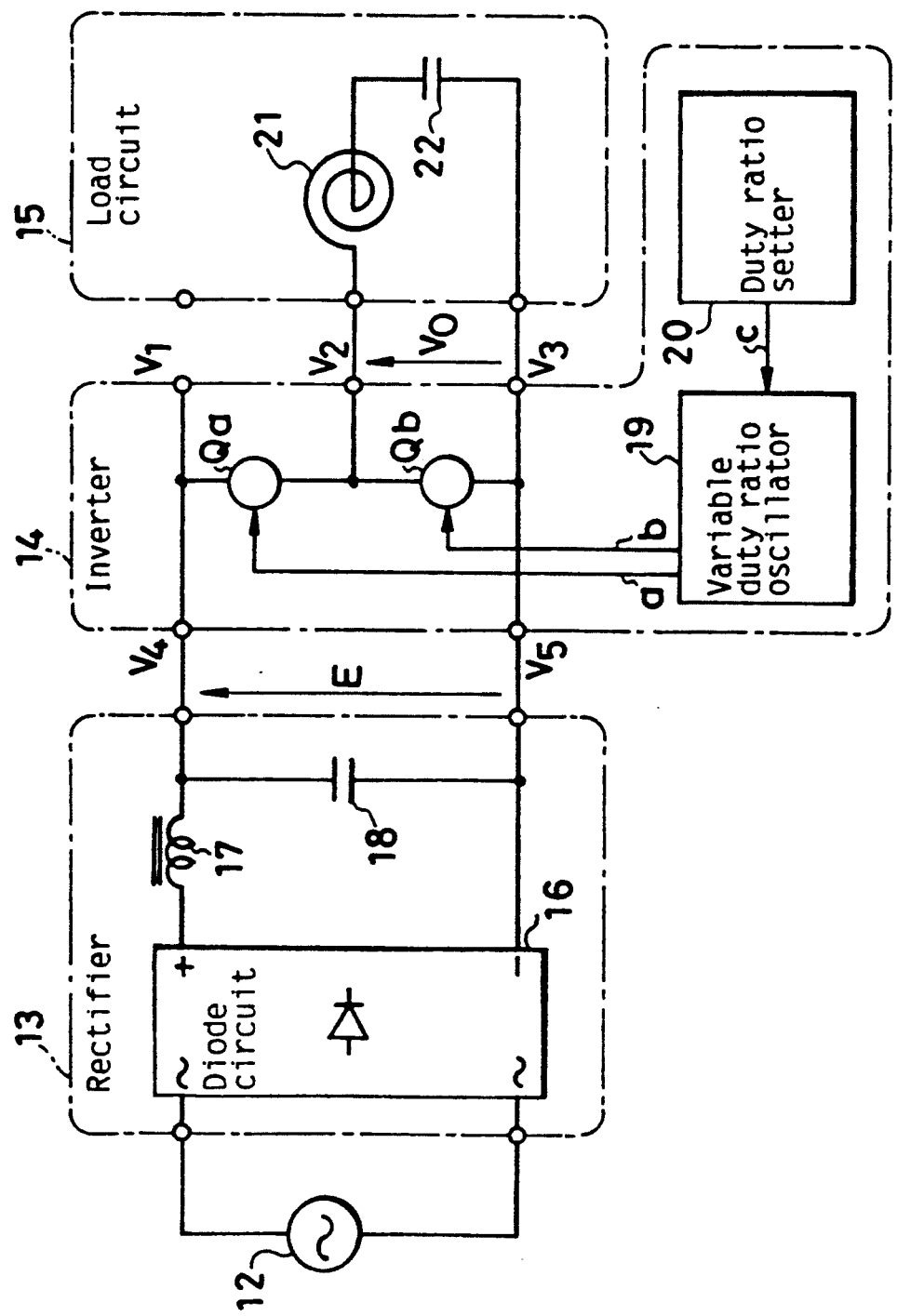
FIG. 1 is a circuit diagram of a preferred embodiment of induction heating cooker embodying the present invention.

FIG. 1 is a circuit diagram of a first preferred embodiment of the induction heating cooker in accordance with the present invention.

As shown in FIG. 1, the induction heating cooker has a rectifier 13, an inverter 14 and a load 15. The rectifier 13 receives AC current from an AC power source 12, and the AC current is rectified by a known diode circuit 16 and smoothed by a smoothing circuit including a smoothing choke 17 and a smoothing capacitor 18. The rectified output is issued to the input terminals $V_4$ and $V_5$ of the inverter 14. The inverter 14 includes a pair of switching elements Qa and Qb which are to be alternately driven (switched on) by receiving respective driving signals "a" and "b" from a variable duty ratio oscillator 19. A duty ratio setter 20 is for setting a desired duty ratio for outputting desired induction heating power to a load circuit 15. By receiving the output "c" of the duty ratio setter 20, the variable duty ratio oscillator 19 issues two output signals "a" and "b" to the switching elements Qa and Qb, respectively, so as to control duty ratios of the high frequency current of a substantially constant period to be controlled by the switching elements Qa and Qb. The load circuit 15 includes an output coil 21, which is for radiating an electromagnetic wave for induction-heating of a cooking object (not shown), and a resonance capacitor 22, which is connected in series to the output coil 21. A series connection of the output coil 21 and the resonance capacitor 22 constitutes a series resonance circuit. The load circuit 15 is connected to receive output high frequency current from the inverter 14. In this embodiment, the load circuit 15 is connected across output terminals $V_2$, which is a junction point between the two switching elements Qa and Qb, and $V_3$, which is the low potential point of the inverter 14.

Figure 2:
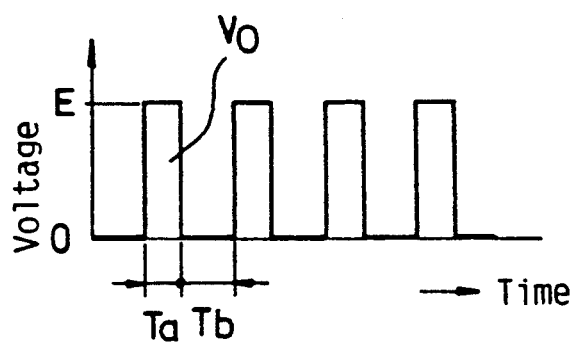
FIG. 2 is a waveform chart showing operation of the induction heating cooker of FIG. 1.

FIG. 2 is a waveform chart showing output voltage $V_0$ to be fed to the load circuit 15 from the output terminals $V_2$ and $V_3$. The output signal $V_0$ is a square wave, as shown in FIG. 2, and its amplitude is substantially identical with the voltage E of the output voltage of the rectifier 13.

The variable duty ratio oscillator 19 varies duty ratio $D = Ta/(Ta+Tb)$ responding to an instruction given by the duty ratio setter 20. The oscillation frequency of the variable duty ratio oscillator 19 is selected substantially around the resonance frequency of the series resonant circuit consisting of the output coil 21 and resonance capacitor 22 of the load circuit 15. Now by defining $$D = Ta/(Ta+Tb) \tag{1}$$

the amplitude of the fundamental wave $V_{01}$ of the output voltage $V_0$ across the load circuit 15 is given by Fourier series' expansion as follows:

$$V_{01} = 2E \sin(\pi D)/\pi \tag{2}$$

The DC component of the voltage $V_0$ does not influence the load circuit 15 which is the series resonance circuit having the capacitor 22. Higher harmonic components have smaller amplitudes $V_{0n}$, as order number becomes higher as is apparent from the equation 2, and further the frequency of the higher harmonics component is sufficiently higher than the resonance frequency of the load circuit 15. Therefore, the harmonic components have no influence on the load circuit 15.

Figure 3:
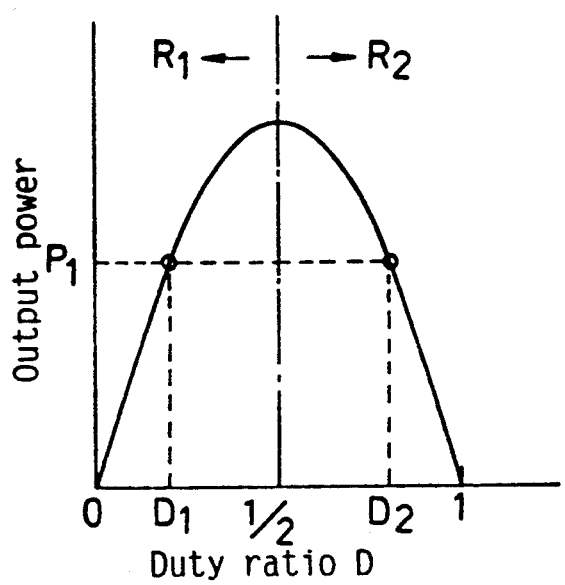
FIG. 3 is a characteristic graph showing operation of the circuit of FIG. 1.

Thus, the operation of the circuit of FIG. 1 can be, in approximation, considered by providing that a high frequency sinusoidal wave voltage having amplitude of $V_{01}$ is impressed on the load circuit 15. Then, as apparent from the equation (2), the changing of the duty ratio D can change the voltage, hence output electromagnetic wave power. FIG. 3 shows relation between the duty ratio D and the output power. That is, by changing the duty ratio D through instruction from the duty ratio setter 20, the output heating power can be changed without changing the oscillation frequency.

According to this embodiment, by varying duty ratio D, power of the electromagnetic heating output can be widely changed without changing the frequency of the electromagnetic wave radiated from the output coil 21. Therefore, even though two or more induction heating cookers are used simultaneously in nearby places, generation of unpleasant interference sound or noise can be avoided.

Apart from the conventional induction heating cooker wherein a rectifier is designed to output almost completely smoothed DC output therefrom, the rectifier circuit 13 in the present invention is designed such that the output current from the rectifier 13 to be given to the inverter 14 has a waveform of full-wave rectified current by selecting the electric constants of the smoothing choke 17 and the filter capacitor 18. By designing so, only using a smaller smoothing choke and smoothing capacitor than the conventional circuit, a sufficient smoothing can be made, and furthermore higher harmonic waves in the input current to the inverter 14 are eliminated. When the time constant determined by the inductance of the smoothing choke 17 and capacitance of the smoothing capacitor 18 is too small, the input current to the inverter has zero value periods between each half circle peaks, and hence, contains much higher harmonic components, thereby resulting in noisy higher harmonic vibration sound of the pan. On the contrary, when the time constant is too large, higher harmonic distortion in the input current becomes large and higher harmonic components which is taken in from the AC power source increases, and furthermore, size of the induction heating cooker increases uselessly.

Furthermore, apart from the conventional induction heating cooker wherein switching of the apparatus is carried out at arbitrary instant thereby sometimes producing a surge voltage due to cutting off of large current at the timing near peak value of AC current, the induction heating cooker in accordance with the present invention can avoid such generation of harmful surge voltage to the AC power line by devising to switch off the large current of the apparatus at the instant of zero-cross point of AC current. Thereby, undesirable effect by the surge pulse to nearby electric apparatuses can be prevented.

Figure 4:
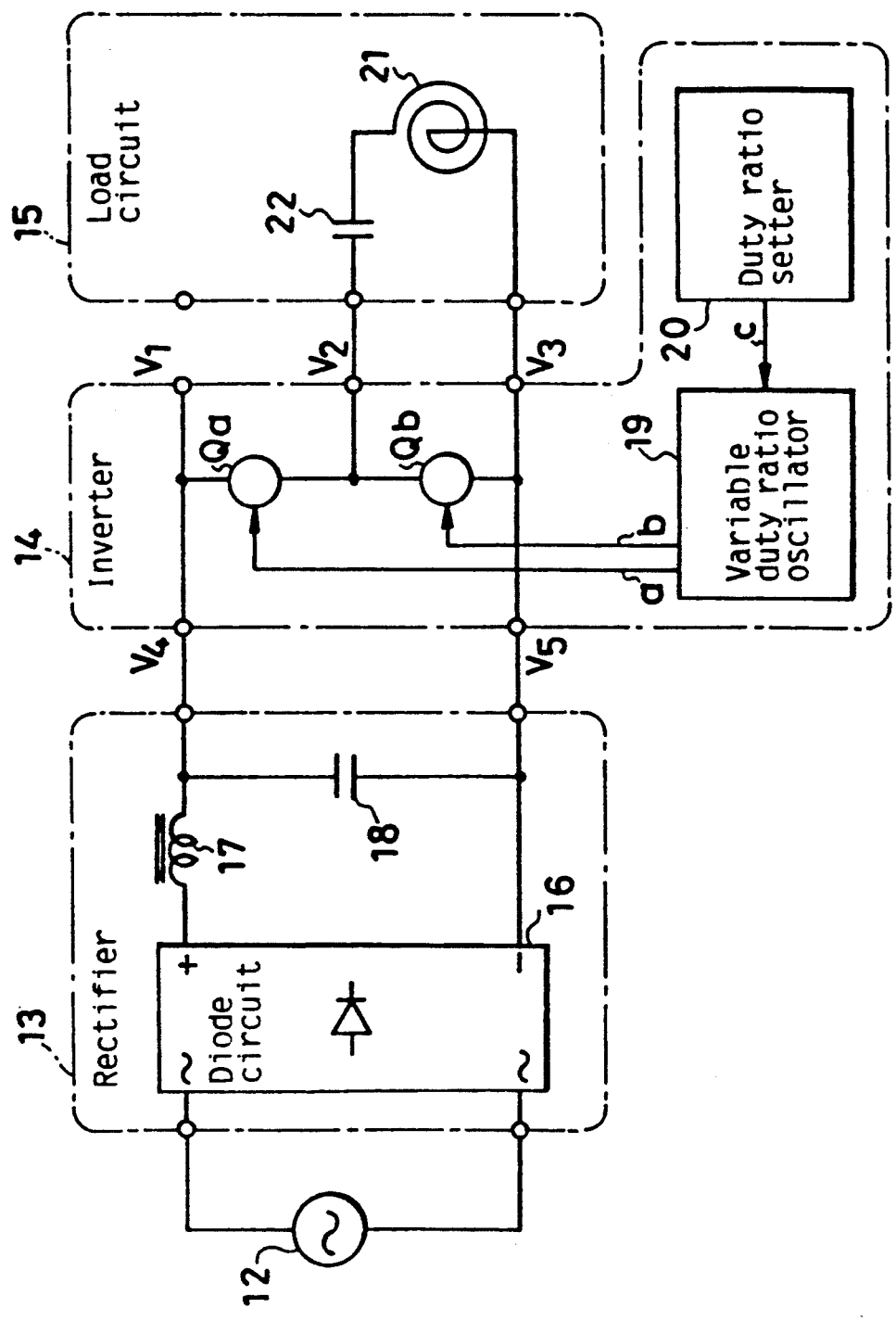
FIG. 4 is a circuit diagram of another preferred embodiment of induction heating cooker in accordance with the present invention.

FIG. 4 shows another embodiment of an induction heating cooker in accordance with the present invention. Corresponding parts and components to the first embodiment are shown by the same numerals and marks, and the description thereon made in the first embodiment similarly apply. Differences and features of this embodiment from the first embodiment are as follows. Principle feature of this embodiment is connection of one end of the output coil 21 in the load circuit 15 to the lower output end $V_3$ of the inverter 14. The circuit configuration has an advantage of low radiation of noise from the output coil 21 because the output coil is connected to be substantially grounded with respect to the high frequency component.

Figure 5:
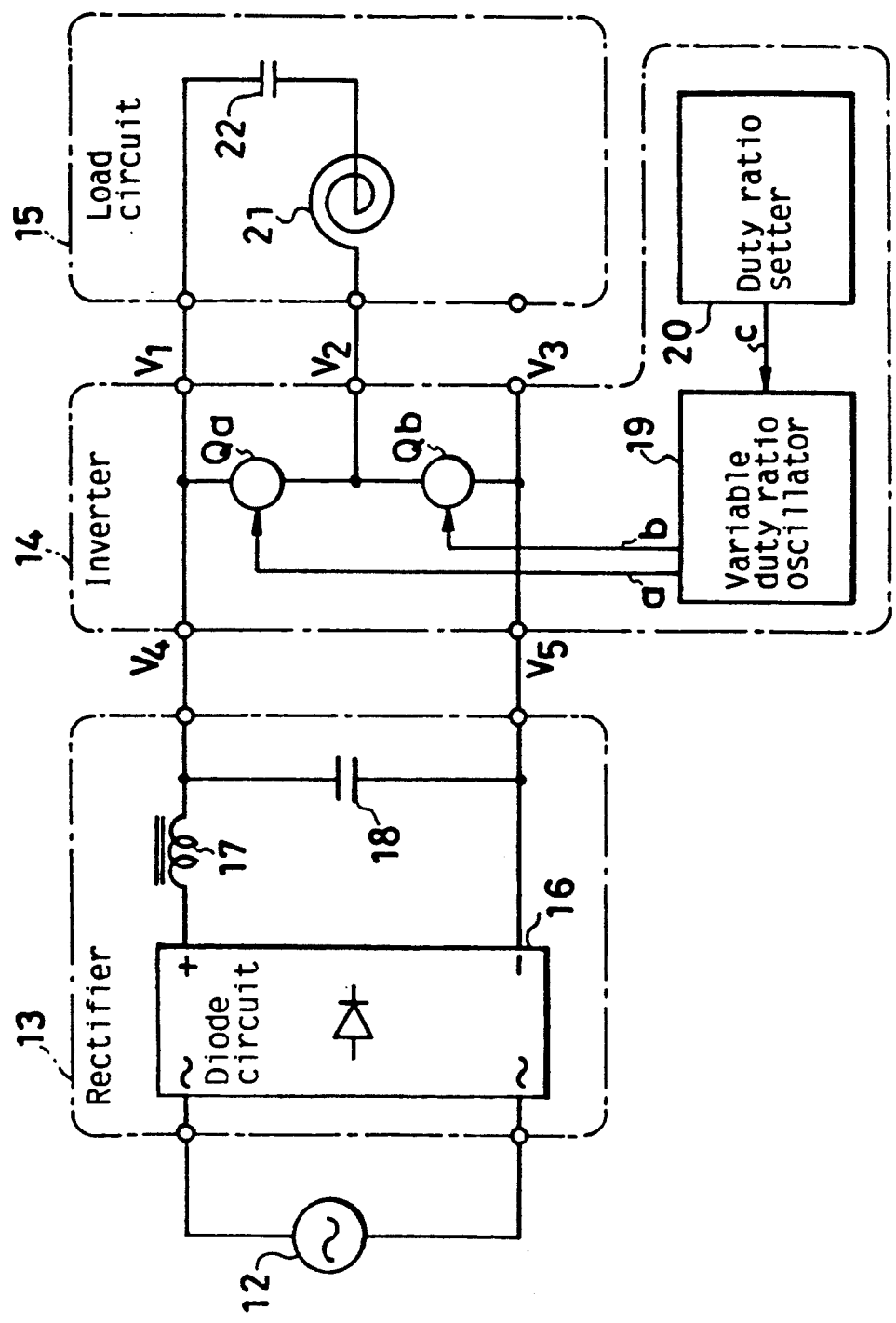
FIG. 5 is a circuit diagram of still another preferred embodiment of induction heating cooker in accordance with the present invention.

FIG. 5 is a circuit diagram of another embodiment of the present invention. Corresponding parts and components to the first embodiment are shown by the same numerals and marks, and the description thereon made in the first embodiment similarly apply. Differences and features of this embodiment from the first embodiment are as follows. In the circuit configuration of this embodiment, the load circuit 15 is connected between the high potential output terminal $V_1$ and the medium potential output terminal $V_2$ of the inverter. This embodiment has a technical advantage in stable operation of the switching element Qa, which has floated driving signal source and hence has a possibility of maloperational conduction at the switching ON of the AC power source 12.

Figure 6:
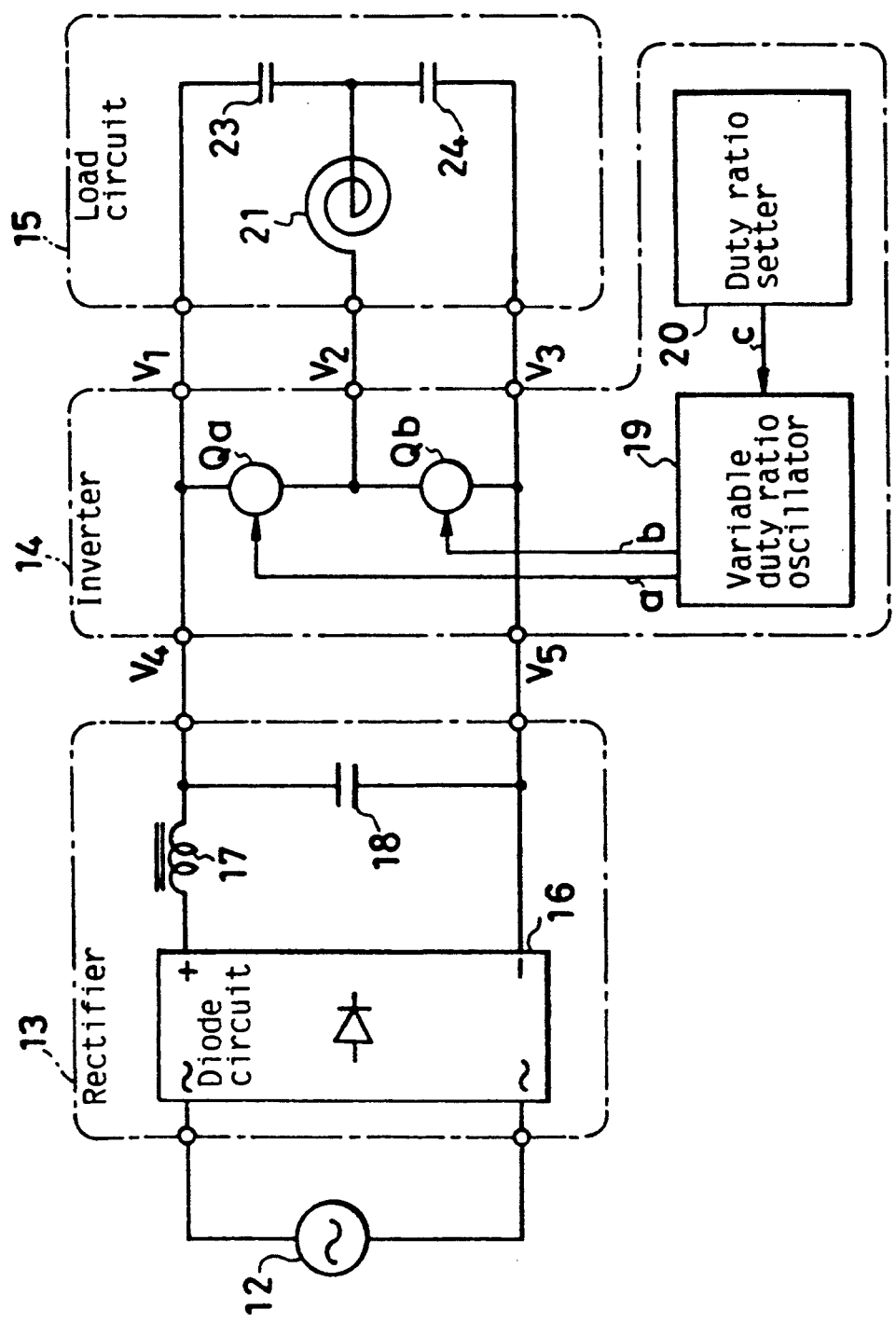
FIG. 6 is a circuit diagram of still another preferred embodiment of induction heating cooker in accordance with the present invention.

FIG. 6 is a circuit diagram of another embodiment of the present invention. Corresponding parts and components to the first embodiment are shown by the same numerals and marks, and the description thereon made in the first embodiment similarly apply. Differences and features of this embodiment from the first embodiment are as follows. Circuit configuration of this embodiment is that two capacitors 23 and 24 are connected in series to each other across the output terminal $V_1$ and $V_3$ of the inverter 14, and the output coil is connected between the medium output terminal $V_2$ and the junction point between the two capacitors 23 and 24. According to this circuit configuration, the switching elements Qa and Qb of a relatively low break down voltage can be used, because possible high voltage produced across the output terminals $V_1$ and $V_3$ transiently at switching ON of the AC power source 12 are divided into two voltages by the series connected resonance capacitors 23 and 24.

Figure 7:
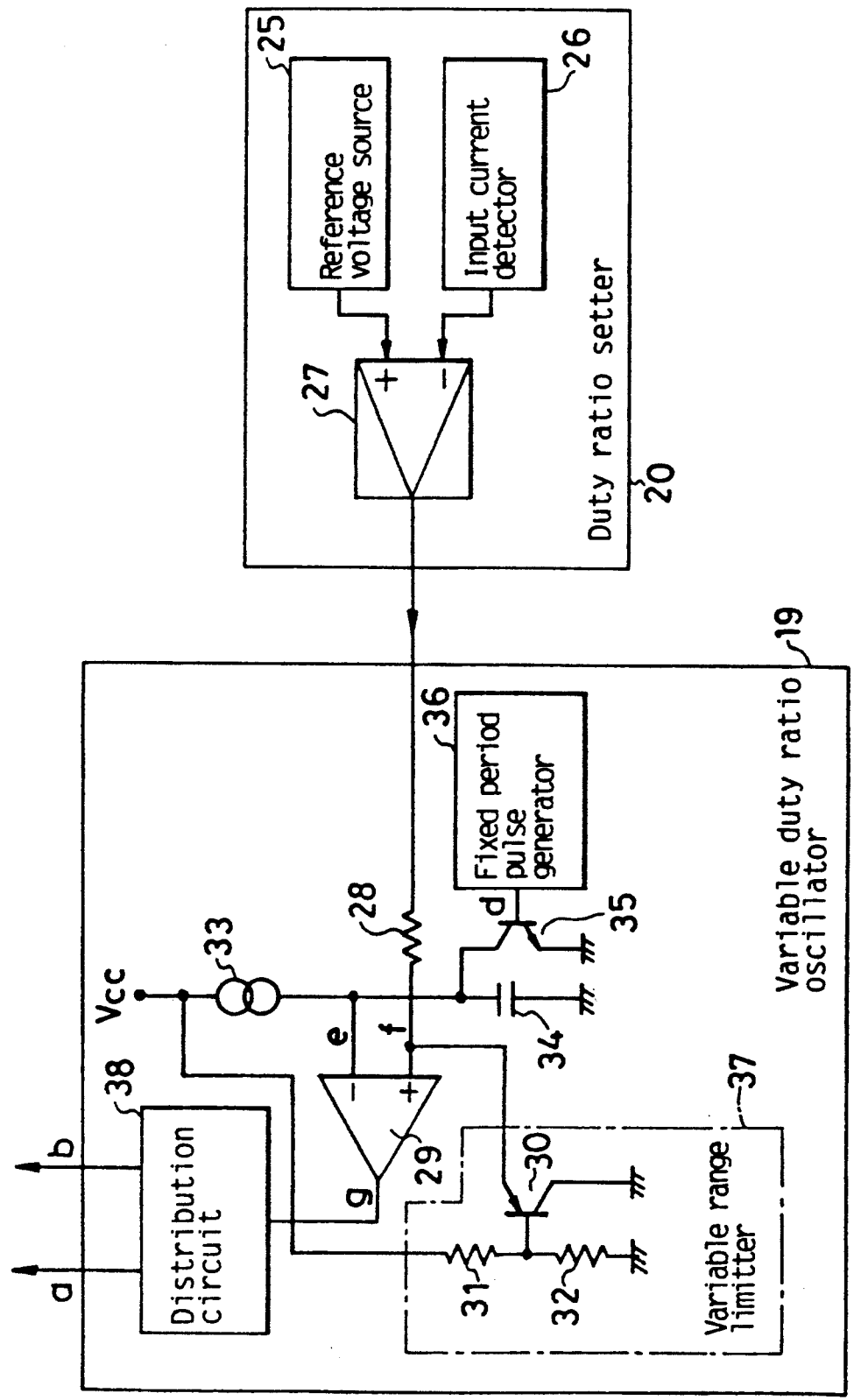
FIG. 7(A) is a circuit diagram of one preferred example of a variable duty ratio oscillator and a duty ratio setter.
FIG. 7(B) is a circuit diagram of a preferred embodiment of the variable duty ratio oscillator and limiter circuit.
Figure 7:
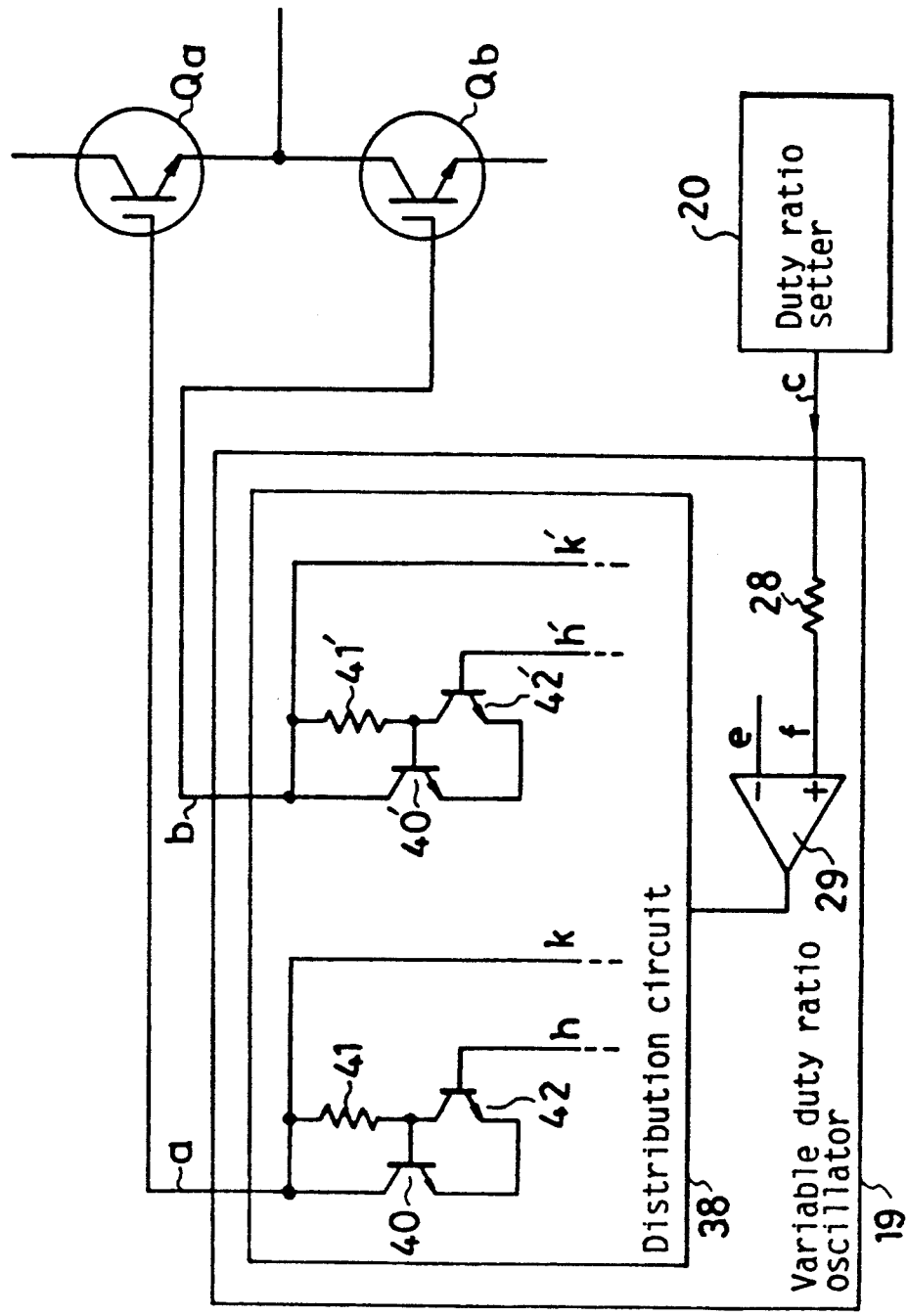
Figure 8:
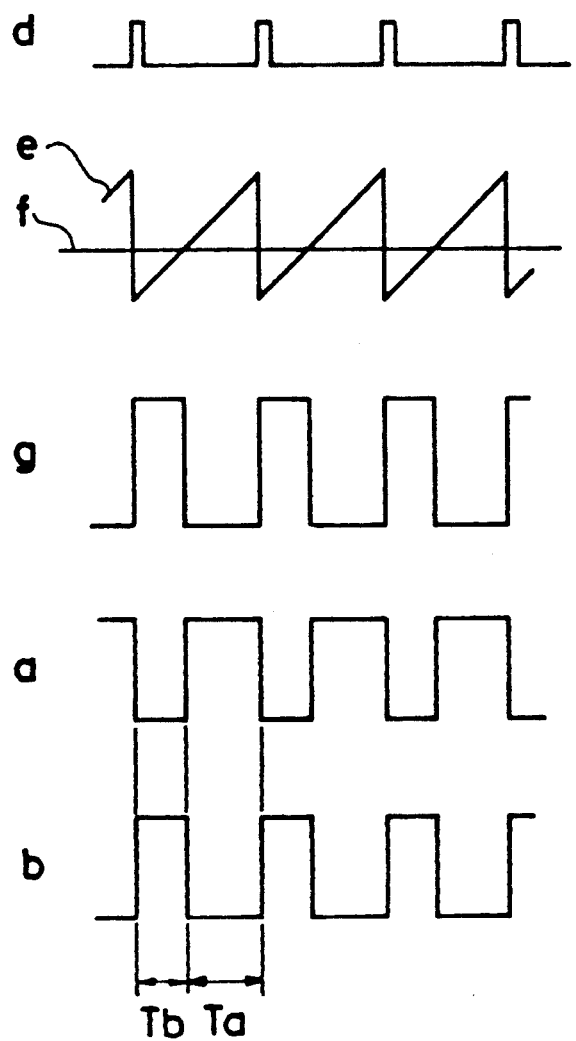
FIG. 8 is a waveform chart showing operation of the circuits of FIG. 7(A) and FIG. 7(B).

FIG. 7(A) is a circuit diagram of one example showing detailed circuit configurations of the variable duty ratio oscillator 19 and the duty ratio setter 20. The duty ratio setter 20 has a reference voltage source 25 and an input current detector 26 which issues an output voltage proportional to the input AC current from the AC power source 12. The input current detector is configured, for instance, by a known current transformer (not shown) coupled to the input line between the AC power source 12 and the rectifier 13 and a rectify-smoothing circuit. As is clearly understandable, the input AC current has high correlation with the output electromagnetic power from the output coil 21 of the load circuit 15. And therefore, by detecting the input current amount and using the measured current amount as input current for a feed back loop to control the inverter 14, the output electromagnetic power from the output coil 21 can be stably controlled. A differential amplifier 27 receives voltage from the reference voltage source 25 and the output from the input current detector 26 and issues an output "c", which is an amplified difference between the two inputs to the differential amplifier 27, and gives it to the variable duty ratio oscillator 19. The output "c" is given through a resistor 28 to an input terminal "f" of a voltage comparator 29, and the same signal is further given to a variable range limiter 37, which consists of a transistor 30 and a voltage divider having two resistors 31 and 32. The signal at the input terminal "f" of the comparator 29 voltage limited by the variable range limiter 37 under such a voltage level VL of $VL = V_{32} + V_{BE30}$, wherein $V_{32}$ is a divided voltage at the junction point between the resistors 31 and 32 and given to the base of the transistor 30, and $V_{BE30}$ is a baseemitter voltage of the transistor 30. The variable duty ratio oscillator 19 comprises, besides the variable range limiter, a constant current source 33, a capacitor 34 to be charged by a current from the constant current source 33, a transistor 35 for short-circuiting the capacitor 34, a fixed period pulse generator 36 and a distribution circuit 38. An output pulse from the fixed period pulse generator 36 is shown in a waveform "d" in FIG. 8.

The operation of the circuit of FIG. 7(A) is as follows. Voltage to the input terminal "e" of the voltage comparator 29 is charged by the current from the constant current source 33 and is charged linearly as shown in curve "e" of FIG. 8. When output pulse "d" is given from the fixed period pulse generator 36, the transistor 35 shortcircuits the capacitor 34. Therefore, the voltage of the input terminal "c" becomes a saw-tooth wave of a constant period as shown by the wave form "c" of FIG. 8. Therefore, the output of the voltage comparator 29 becomes a pulse wave as shown by a wave form "g" in FIG. 8, which is high in the period of e<f. The distribution circuit 38 outputs low level (Lo) at its output terminal "a" and high level (Hi) at its output terminal "b" when the output signal "g" of the comparator 29 is high (Hi). On the contrary, when the output "g" is low (Lo) the output "a" of the distribution circuit becomes high (Hi) and output "b" thereof becomes low (Lo). As is well known, in order to prevent undesirable parallel switching-ON of the switching elements Qa and Qb of FIG. 1, it is preferable to provide a suitable short low-level period (dead time) between a fall and subsequent rise timings of pulses "a" and "b". When the upper limit VL of the signal of the input terminal "f" is determined to be $(\frac{1}{2})E$ or smaller, the duty ratio D of equation 1 is limited in the range of $\frac{1}{2}$ or larger of FIG. 3, as is obvious from the waveforms "a" and "b" of FIG. 8. But for the variable range limiter 37 of FIG. 7(A), if the output power of the inverter 14 is intended to be controlled to $P_1$ of FIG. 3, there are two corresponding points $D_1$ and $D_2$ on the curve of FIG. 3, thereby inducing a difficulty of stably carrying out a feedback control using the output of the input current detector 26. Therefore, the variable range limiter 37 provide a stable feedback control of the output electromagnetic wave power by the limiting of the operation range to $R_2$ of FIG. 3, thereby uniquely determining the duty ratio corresponding to the output power $P_1$.

As is easily understandable, when polarities of the input terminals of the voltage comparator 29 and the differential amplifier 27 of FIG. 7a are inverted, the operation range becomes in the range of $R_1$ of FIG. 3, wherein $D < \frac{1}{2}$, and also in this case a stable operation is obtainable.

As a modified embodiment of FIG. 7(A), in place of the input AC current, other detected values such as current of the output coil 21, voltage of the resonance capacitor 22, and the like physical amounts, which have correlation with the output electronic magnetic power, may be used as input signal to be given to the differential amplifier 27.

Furthermore, overloads to the switching elements Qa and Qb owing to a variation of load, etc., can be avoided by detecting a physical amount which has correlation with the output currents of the switching element Qa and Qb and using it in a feedback control system. For such physical amount, for instance, peak current value of the switching elements Qa and/or Qb, peak voltage value of the resonance capacitor 22, peak current value of the output coil 21, etc. can be used.

FIG. 7(B) is a circuit diagram of a preferred embodiment of the variable duty ratio oscillator 19 comprising the distribution circuit 38. The distribution circuit 38 comprises a pair of transistors 40 and 40' which are coupled with pre-stage transistors 42, 42'. Base driving lines h and h' give base current to the transistors 42 and 42' only when a sufficient power is supplied to the variable duty ratio oscillator 19 from the AC power source 12. When the AC power source 12 is not connected to the circuit of the induction heating cooker, the variable duty ratio oscillator 19 is not supplied with the sufficient power current, and therefore, the transistors 42 and 42' are cut off. And therefore, clipping circuits consisting of the transistors 40 and 40' and registers 41 and 41' limit the gate voltages of the switching elements Qa and Qb around below $V_{BE40}$ and $V_{BE40'}$ (base-emitter voltages of the transistors 40 and 40'), respectively. By this clipping action of the driving signals "a" and "b", maloperational conductions of the switching elements Qa or Qb (through their feedback capacitance) is prevented even when such maloperation is about to be induced by generation of sharp rise of collector-emitter voltages of the transistors Qa and Qb at the instant of connection of the AC power source to the induction heating cooker.

Figure 9:
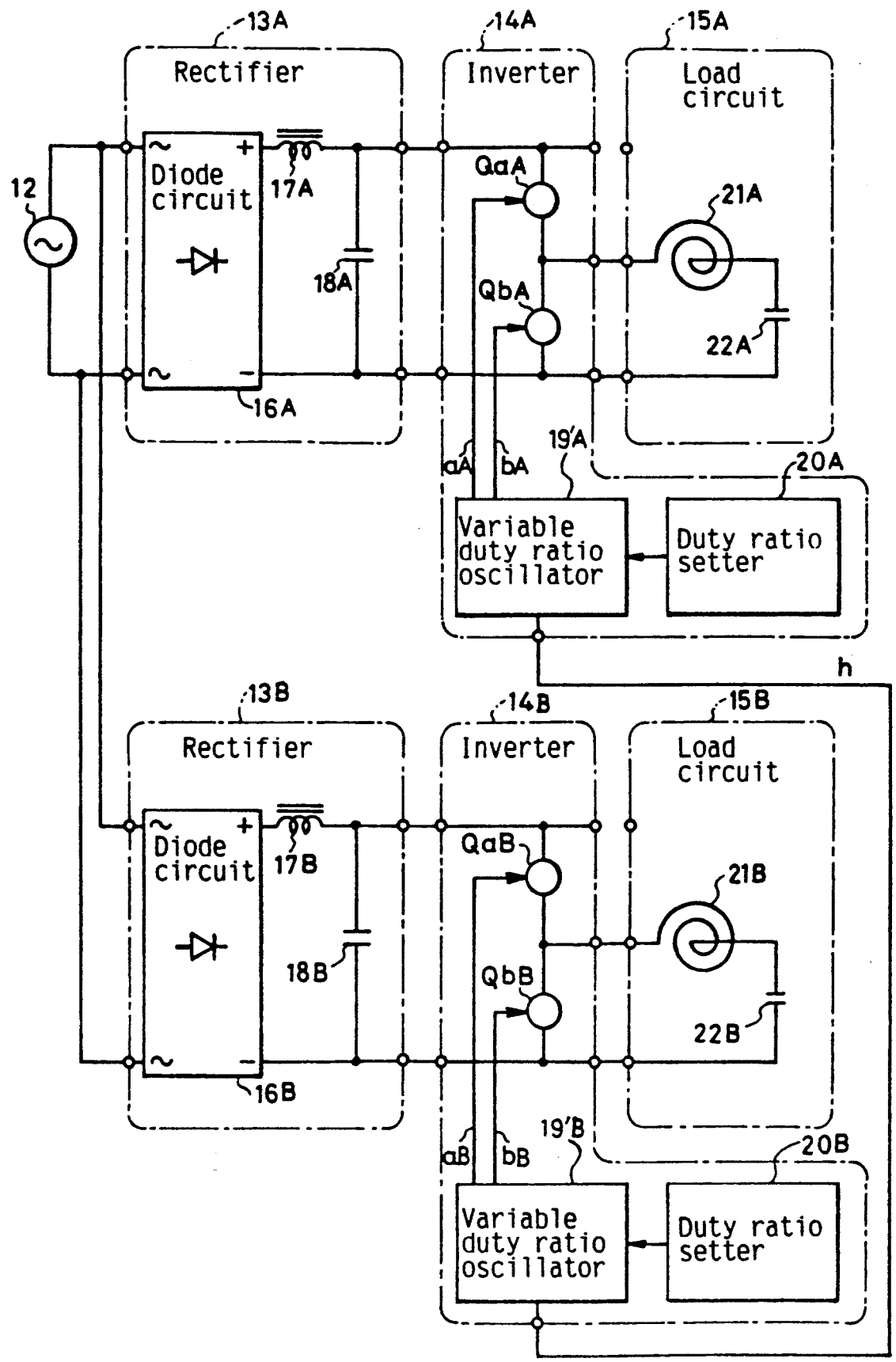
FIG. 9 is a circuit diagram of still another preferred embodiment of induction heating cooker in accordance with the present invention.

FIG. 9 is a circuit diagram of another embodiment of the present invention. Corresponding parts and components to the first embodiment are showb by the same numerals and marks, and the description thereon made in the first embodiment similarly apply. Differences and features of this embodiment from the first embodiment are as follows.

In this embodiment, a common AC power source 12 supplies AC current to a first rectifier 13A and a second rectifier 13B. A first inverter 14A and a second inverter 14B receive rectified DC current from the first rectifier 13A and the second rectifier 13B, respectively. A first load circuit 15A and a second load circuit 15B receive high frequency power from the first inverter 14A and the second inverter 14B, respectively. The first rectifier 13A and the second rectifier 13B comprises a first diode bridge 16A and a second diode bridge 16B, a first smoothing choke 17A and a second smoothing choke 17B, and a first smoothing capacitor 18A and a second smoothing capacitor 18B, respectively. The first inverter 14A comprises a first switching element QaA and a second switching element QbA, and the second inverter 14B comprises a third switching element QaB and a forth switching element QbB, respectively. Further, the first inverter 14A further comprises a first variable duty ratio oscillator 19'A and a first duty ratio setter 20A. The second inverter similarly comprises a second variable duty ratio oscillator 19'B and a second duty ratio setter 20B. A first load circuit 15A and a second load circuit 15B comprise a series connection of a first output coil 21A and a first resonance capacitor 22A and a second series connection of a second output coil 21B and a second resonance capacitor 22B, respectively. The detailed configurations of the circuit and their operations are similar to those of FIG. 1.

Figure 10:
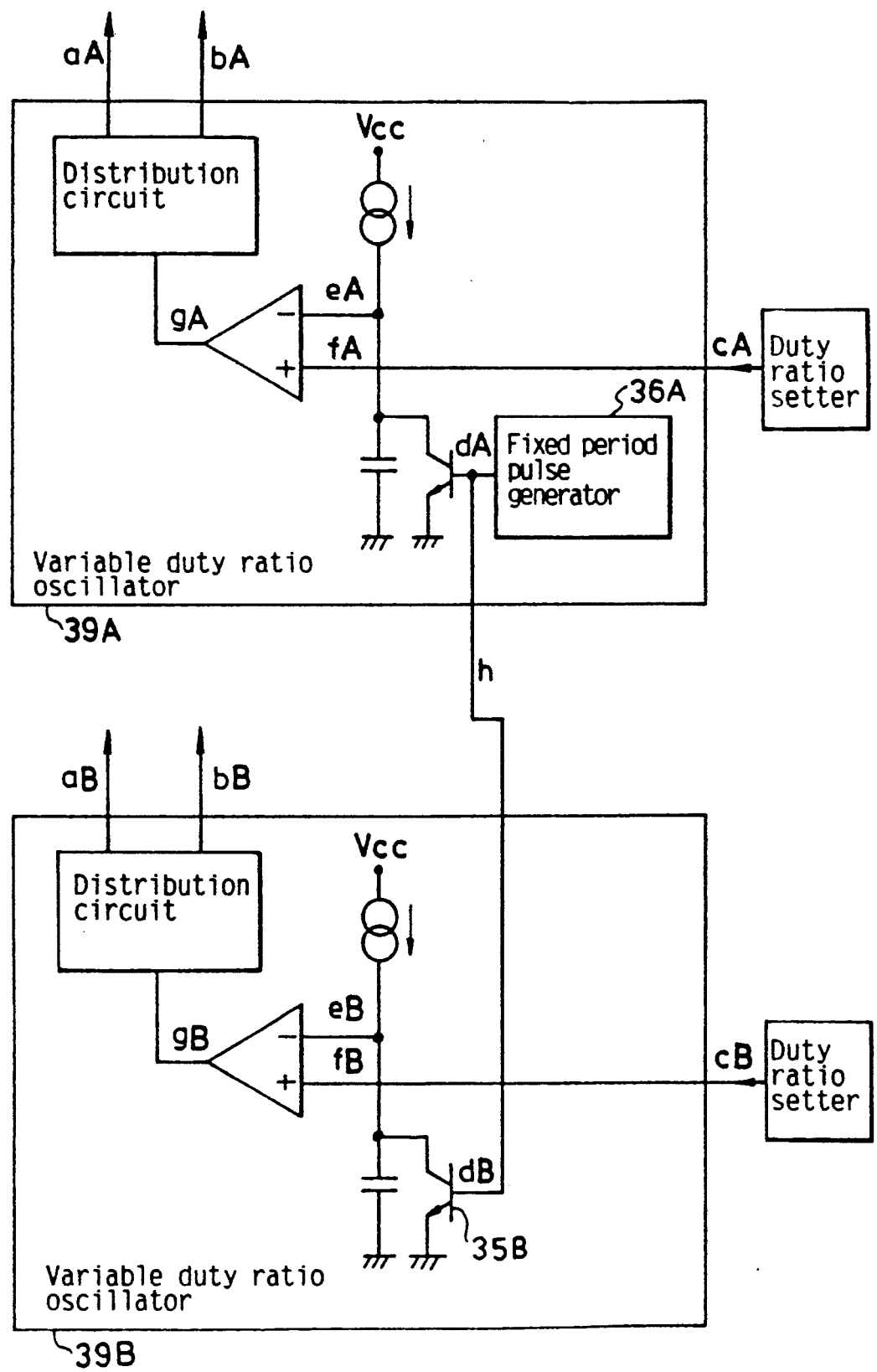
FIG. 10 is a circuit diagram of a preferred embodiment of variable duty ratio oscillators of the embodiment of FIG. 9.

The details which differ from the first embodiment will be described with reference to FIG. 10. The abovementioned configurations have variable duty ratio oscillators 19'A and 19'B which are each other commonly connected by a line h. As shown in FIG. 10, both variable duty ratio oscillators 19'A and 19'B share a common fixed period pulse generator 36. That is output of the common fixed period pulse generator 36 fed to the to the bases dA and dB of the transistors 35A and 35B of the variable duty ratio oscillators 19'A and 19'B, respectively. Therefore, as will be easily understood from the aforementioned descriptions made for the circuit of FIG. 7(A), both variable duty ratio oscillators 19'A and 19'B oscillate in synchronism with each other. By the configuration shown by FIG. 9 and FIG. 10, even though there may be some slight difference between the high frequency of the output current from two inverters 14A and 14B owing to divergence of mass production, temperature difference, time lapse change of characteristics of electronics components therein, or the like, there is no interference sound produced when the two induction heating cooker are operated simultaneously. This is because the two output coils 21A and 21B output electromagnetic waves of accurately synchronized operation.

Of course, the configuration of plural output coil to be parallelly operated in a synchronized manner may be configurated to provide three or more output coils.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An induction heating cooker comprising:
   a rectifier for producing a DC current by rectifying an AC current,
   an inverter having first and second switching elements, connected in series across output terminals of said rectifier,
   a variable duty ratio oscillator for generating square wave signals which are constant in frequency but variable in duty ratio and applying said signals to alternately drive said first and second switching elements to turn on said switching elements in a manner such that said switching elements are alternately rendered conductive in a complementary manner such that said first and second simultaneous switching elements are not both conductive or both non-conductive at the same time, to thereby produce an output inverter signal, wherein said variable duty ratio oscillator comprises a variable range limiter for limiting a duty ratio of said variable duty ratio oscillator to one of a range, selected from a range of duty ratios from zero to $\frac{1}{2}$ and a range of duty ratios from $\frac{1}{2}$ to 1,
   duty ratio setting means for setting a duty ratio of said square wave signal, said duty ratio setting means comprising a physical amount detector for detecting a physical amount which has a correlation with one of input power of said induction heating cooker or with current of said at least two switching elements and a differential amplifier which compares an output of said physical amount detector with a predetermined reference value, and
   a load circuit having an output coil and a resonant capacitor, coupled to receive said output inverter signal.

2. An induction heating cooker comprising:
   a rectifier for producing a DC current by rectifying an AC current, an inverter having first and second switching elements, connected in series across output terminals of said rectifier, a variable duty ratio oscillator for generating square wave signals which are constant in frequency but variable in duty ratio and applying said signals to alternately drive said first and second switching elements in a manner such that said switching elements are alternately rendered conductive in a complementary manner such that said first and second simultaneous switching elements are not both conductive or both non-conductive at the same time to thereby produce an output inverter signal, said variable duty ratio oscillator producing a duty ratio proportional to an input voltage thereto, duty ratio setting means for setting a duty ratio of said square wave signal, and a load circuit having an output coil and a resonant capacitor, coupled to receive said output inverter signal, said duty ratio setting means including means for receiving a parameter indicative of an output electromagnetic power of the cooker, means for comparing said parameter with a reference, and means for outputting a voltage indicative of a difference between said parameter and said reference and applying it as said input voltage to said variable duty ratio oscillator.

3. An induction heating cooker as in claim 2 wherein said variable duty ratio oscillator includes means for using said input voltage to charge a capacitor, and means for producing a square wave output signal having a duty cycle depending on how much said capacitor charges within a fixed period.

* * * * *